United States Patent [19]

Shaklee et al.

[11] Patent Number: 6,031,557
[45] Date of Patent: Feb. 29, 2000

[54] BI-DIRECTIONAL SWEEPING FOR COLOR CRT PRINTERS

[75] Inventors: Kerry L. Shaklee, Brighton; Daniel C. O'Brien, Conifer; Kurt A. Leniger, Littleton; Gary L. Brackett, Canon City; Richard W. Denny, Littleton, all of Colo.

[73] Assignee: Sienna Imaging, Inc., Englewood, Colo.

[21] Appl. No.: 09/152,906

[22] Filed: Sep. 14, 1998

Related U.S. Application Data

[63] Continuation-in-part of application No. 09/118,486, Jul. 17, 1998.

[51] Int. Cl.[7] .............................. G09G 1/04; H01J 29/70; H01J 29/72
[52] U.S. Cl. ..................... 347/226; 347/229; 347/231; 347/232; 347/250; 347/254; 315/370
[58] Field of Search ................................ 347/226, 229, 347/231, 235, 250, 232, 254; 348/205, 206, 210, 260, 266, 256, 440; 315/367, 370, 385, 386, 393, 394

[56] References Cited

U.S. PATENT DOCUMENTS 4,358,789  11/1982  Confer ..................................... 358/140
4,680,599  7/1987  Wertz et al. ............................. 340/744
5,084,656  1/1992  Sturm et al. ............................. 315/364
5,239,243  8/1993  Rothe et al. ............................. 315/367
5,652,482  7/1997  Tripod ..................................... 315/370

Primary Examiner—Edward P. Westin
Assistant Examiner—Nikita Wells
Attorney, Agent, or Firm—James R. Young

[57] ABSTRACT

Disclosed is a photographic printer with bi-directional sweeping of a color CRT to expose a photosensitive medium. Image data from a host system is received by the printer and stored in a data drive system. The data drive system converts the data into a series of rows of dot row data to produce the appropriate image desired. Linear deflection amplifiers sweep the CRT's electron beam across the color phosphor areas on the face of the CRT to expose the medium utilizing the dot row data. The present invention sweeps and writes data bi-directionally, eliminating the retrace period associated with sweeping and writing in one direction, and without any hold periods once printing starts. The data in every other dot row is processed in reverse order so that the dot row data utilized in the reverse writing sweep will be exposed onto the medium in proper relationship to the rows written before and after it.

38 Claims, 5 Drawing Sheets

BI-DIRECTIONAL SWEEPING FOR COLOR CRT PRINTERS

CROSS REFERENCE TO RELATED APPLICATIONS

This application is a continuation-in-part of application Ser. No. 09/118,486 of Kerry L. Shaklee et al. filed on Jul. 17, 1998 entitled Bi-Directional Sweeping for Monochrome CRT Printers.

FIELD OF THE INVENTION

This invention relates to printers for computer systems and more particularly to Cathode Ray Tube (CRT) display systems within such printers. Even more particularly, the invention relates to bi-directional sweeping of the CRT electron beam within a color CRT display system of such a printer.

BACKGROUND OF THE INVENTION

Photographic process printers that utilize CRT's for exposing a photosensitive medium typically use linear deflection amplifiers to sweep the CRT electron beam across the face of the CRT. A deflection cycle normally consists of a sweep, retrace, and hold period. During the active sweep period, the CRT is unblanked and the CRT electron beam is driven horizontally at a particular vertical position while being modulated with image data to expose the medium. During the retrace period, the CRT is blanked and the CRT electron beam is returned to a home position to wait for the start of the next sweep. Thus, the sweep and retrace periods are typically fixed time intervals. The CRT electron beam is then held in the home position for the hold period until a new sweep is initiated. Therefore, the hold period may be a variable time interval dependent on the print speed. The duty cycle thus has two potential periods of off-duty time where the CRT is blanked: the retrace period and the optional hold period. These off-duty periods slow down the print process considerably.

It is thus apparent that there is a need in the art for an improved sweep method that can reduce the off-duty time in order to optimize the duty cycle and increase the print speed. There is also a need in the art to eliminate the hold period after every sweep to further optimize the duty cycle and further increase the print speed. The present invention meets these and other needs in the art.

This application is a continuation-in-part application Ser. No. 09/118,486 of Kerry L. Shaklee et al. filed on Jul. 17, 1998 entitled Bi-Directional Sweeping for Monochrome CRT Printers, which is incorporated herein by reference for all that is disclosed and taught therein.

SUMMARY OF THE INVENTION

It is an aspect of the present invention to increase the duty cycle of a color CRT photographic printer by sweeping bi-directionally, eliminating the retrace period associated with sweeping in one direction.

It is another aspect of the invention to increase the duty cycle of a color CRT photographic printer by eliminating the normal hold period after each sweep.

Yet another aspect of the invention is to reverse the order that dot row data, used for modulating the CRT electron beam, is taken such that the dot row data, corresponding to the reverse sweep, is taken in a reverse direction.

Still another aspect of the invention is to blank the CRT electron beam at the end of each bi-directional sweep to allow for turn around of the CRT electron beam.

A further aspect of the invention is to utilize a home position for parking the CRT electron beam only when not printing an image.

A still further aspect of the invention is to drive the CRT electron beam at a constant velocity across the face of the CRT by utilizing look up tables to store values that are used to control beam deflection.

Another aspect of the invention is to align each position on an exposed line on the photosensitive medium exposed in the forward direction, with each corresponding position on the next exposed line on the photosensitive medium exposed in a reverse direction.

A still further aspect of the invention is to always sweep a first one of the three color phosphor stripes on the face of the CRT in a forward direction, always sweep a second one of the three color phosphor stripes in a reverse direction, and sweep the third one of the three color phosphor stripes alternately between a forward direction and a reverse direction.

The above and other aspects of the invention are accomplished in a photographic printer which uses a color CRT to expose photosensitive medium. Image data sent from a host system is received by the photographic printer and stored in a data drive system. The data drive system converts the data to a series of rows of dot row data to produce the desired image. A vertical linear deflection amplifier is used to position the beam vertically to the desired color phosphor row, and a horizontal linear deflection amplifier is used to then sweep the CRT's electron beam across the face of the CRT, while the data is used to modulate the beam, causing light to be emitted from the face of the CRT in order to expose the photosensitive medium with the dot row data. The photosensitive medium may be located adjacent to the face of the CRT, and advanced in a direction perpendicular to the face of the CRT. The CRT may expose the photosensitive medium one line at a time, a block at a time, or an entire page at a time, depending upon the type of CRT used. Alternatively, there may be optics, such as a lens, between the face of the CRT and the photosensitive medium that projects the light onto the photosensitive medium as it is advanced in the focal plane of the lens.

The present invention sweeps bi-directionally across the face of the CRT, in a forward and a reverse direction, eliminating the long retrace period associated with sweeping in a single direction, and eliminating any hold periods while printing the image. Thus, the duty cycle is increased. The data in every other dot row is taken in reverse order so that the dot row data utilized in the reverse sweep will be exposed onto the photosensitive medium in proper relationship to the rows above and below it.

In one embodiment of the invention, the first row of dot row data is displayed during a forward sweep at the first desired color phosphor row with the CRT unblanked. At the end of the sweep, the CRT is blanked while the horizontal velocity is reversed and a vertical adjustment is made to the photosensitive medium to bring the next to proper exposure position. The second row of dot row data is displayed in reverse order and is displayed during a reverse sweep at the next desired color phosphor row with the CRT unblanked. At the end of the second sweep, the CRT is blanked again while the horizontal velocity is reversed and the next vertical adjustment of the photosensitive medium is made. The next sweep utilizes the next row of dot row data and sweeps in the forward direction at the next desired color phosphor row, and so on.

In another embodiment of the invention, the electron beam exposes non consecutive lines on the photosensitive medium with different rows of dot row data in a sequence that allows the photosensitive medium to be advanced past the face of the CRT in a continuous fashion. The photosensitive medium is moved in conjunction with the alternating forward and reverse sweeps such that every row of dot row data is used to modulate the electron beam across each of the three color phosphor rows to expose one line on the photosensitive medium in a non-consecutive order. This procedure, of alternating sweep direction, forward and reverse, with dot row data that is taken in forward and reverse order from row to row, sweeping across the different color phosphor stripes on the face of the CRT to expose lines in the photosensitive medium in non-consecutive order, in conjunction with continuously moving the photosensitive medium, is followed until all of the dot row data for the image has been utilized. Because the sweeping of the electron beam is extremely fast compared to the continuous movement of the photosensitive medium, the line of media being exposed remains substantially aligned with the horizontal path of the electron beam along the color phosphor stripe.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
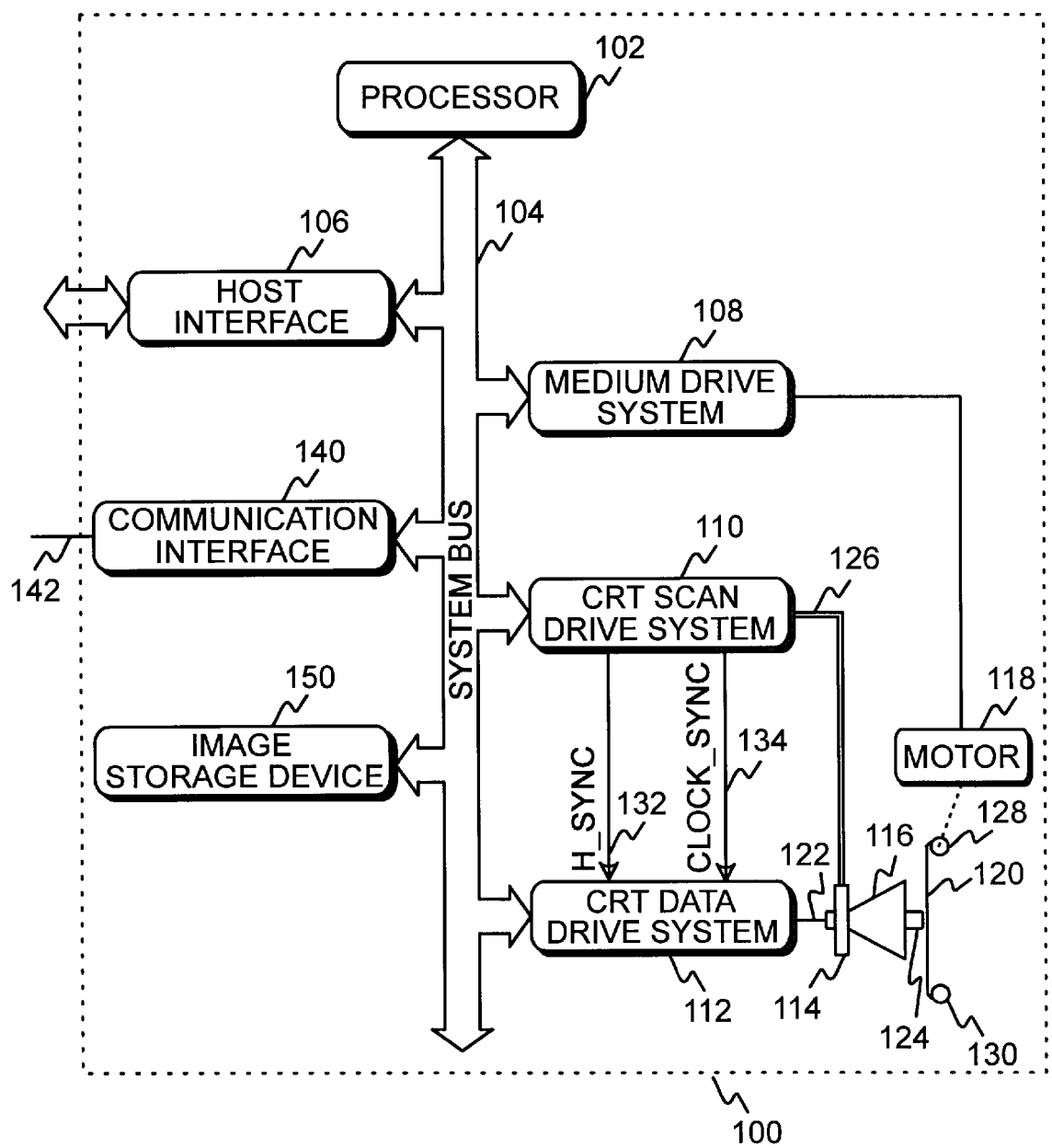
FIG. 1 shows a block diagram of a color photographic printer system incorporating the present invention.

FIG. 1 shows a block diagram of a color photographic printer system incorporating the present invention. Referring now to FIG. 1, a color photographic printer 100 contains a control digital processing unit 102 which communicates to other components of the system over a system bus 104. During the image acquisition process, control digital processing unit 102 uses a host interface 106 to receive image and control data from a host system (not shown) or it may receive image and control data directly from the image storage device 150. Control digital processing unit 102 stores this data in a CRT data drive system 112. The output signal 122 of the CRT data drive system 112 is connected to a CRT 116 and used to modulate the electron beam within CRT 116. Light created when the electron beam strikes the phosphor of CRT 116 is conducted through a CRT fiber optic faceplate 124 to expose medium 120. Medium 120 is photosensitive, recording the image data displayed on CRT 116 and conducted through CRT fiber optic faceplate 124.

During the printing process, deflection of the electron beam of CRT 116 is controlled by a CRT scan drive system 110. In the preferred embodiment of the invention, electron beam deflection of CRT 116 is controlled magnetically by a CRT yoke 114, having a CRT vertical deflection winding and a CRT horizontal deflection winding, which are driven by output signal 126. Deflection of the electron beam may also be controlled electrostatically by sending output signal 126 to a CRT having electrostatic plates instead of a magnetic yoke.

CRT scan drive system 110 controls the start of each horizontal sweep, and communicates the beginning of active data that will expose medium 120 to CRT data drive system 112, through an H_SYNC signal 132, and further sends data synchronization information to CRT data drive system 112 through a CLOCK_SYNC signal 134.

Medium 120 is moved by a medium roll 128 which is powered by a motor 118. Motor 118 is operated by a medium drive system 108, which is controlled over system bus 104 by control digital processing unit 102.

A communications interface 140 can be used to input EEPROM (Electrically Erasable Programmable Read Only Memory chip) operation and calibration data into color photographic printer 100, and image storage device 150 can also be used to load EEPROM data. EEPROM data can also be received over host interface 106.

Operation of the system begins when control and image data is received over host interface 106. Control digital processing unit 102 takes the data from host interface 106 and stores the data in CRT drive system 112. CRT data drive system 112 converts the image data, according to control data information, into a series of rows of dot row data to produce the appropriate image desired. Medium drive system 108 is then used to move medium 120 in front of the color phosphor stripes on the face of CRT fiber optic faceplate 124. CRT scan drive system 110 is then activated to sweep the CRT electron beam across one of the phosphor stripes in a forward direction while CRT data drive system 112 modulates the CRT electron beam intensity according to the dot row data taken in the forward direction to expose medium 120. The process is repeated in a sweep in the reverse direction for one of the other color phosphor stripes. One line of exposed photosensitive medium is complete after all three phosphor stripes—red, green, and blue—have been swept and modulated with dot row data. This process is repeated until all of the dot row data has been processed, exposing the desired image onto the photosensitive medium. One skilled in the art will recognize that although a three color phosphor stripe CRT is standard, a two color phosphor stripe CRT may be used. In addition, a line of photosensitive medium may be exposed by utilizing only one of the three color phosphor stripes, or a combination of any two of the three color phosphor stripes.

Figure 2:
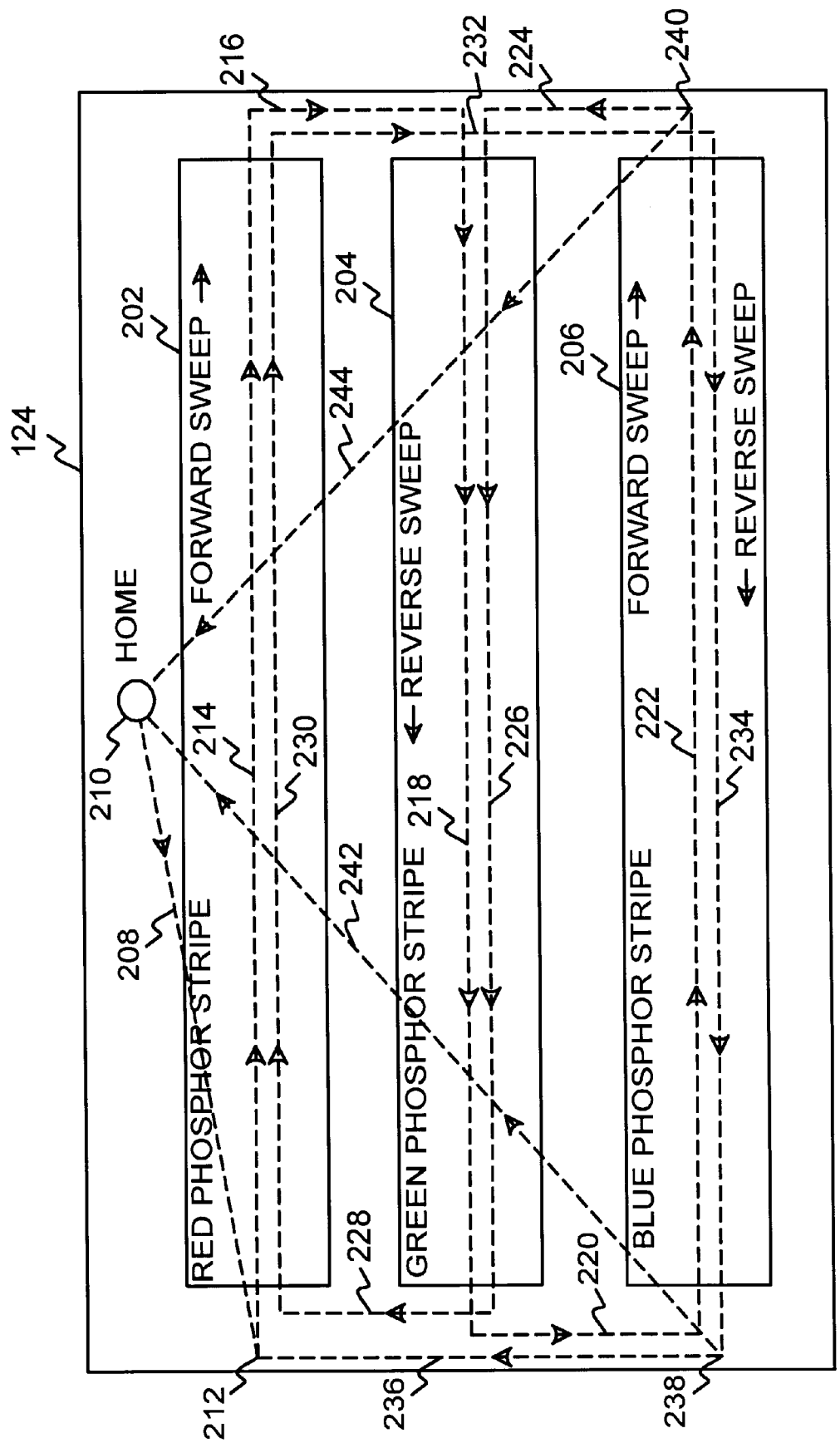
FIG. 2 shows a diagram of the faceplate of a three color phosphor stripe CRT utilized in the bi-directional sweep method of the present invention.

FIG. 2 shows a diagram of the faceplate of a three color phosphor stripe CRT, and illustrates the color phosphor stripes as well as the bi-directional sweep method of the present invention. Referring now to FIG. 2, CRT fiber optic faceplate 124 contains a red phosphor stripe 202, a green phosphor stripe 204, and a blue phosphor stripe 206. One skilled in the art will recognize that the three color phosphor stripes may be placed in stacked relationship to each other in CRT fiber optic faceplate 124 in six possible combinations. Further, one skilled in the art will recognize that the CRT fiber optic faceplate may be coated with a multiplicity of narrower stripes of each color. In the preferred embodiment of the invention, red phosphor stripe 202 is located at an uppermost position in CRT fiber optic faceplate 124, blue phosphor stripe 206 is located at a lowermost position in CRT fiber optic faceplate 124, a green phosphor stripe 204 is located in a middlemost position in CRT fiber optic faceplate 124.

Dotted line 208 shows the CRT electron beam path from a home position 210, prior to the commencement of the photographic print process, to a forward sweep starting position 212, located at a left most end of CRT fiber optic faceplate 124, during which the CRT is blanked. One skilled in the art will recognize that the forward sweep starting position could also be located at a right most end of CRT fiber optic faceplate 124, and could also be located vertically to align with green phosphor stripe 204 or blue phosphor stripe 206. In the preferred embodiment of the invention, the starting position is located at forward sweep starting position 212.

A forward sweep begins at forward sweep starting position 212. The electron beam then travels horizontally along dotted line 214 across red phosphor stripe 202 on CRT fiber optic faceplate 124 during which the CRT is unblanked, and the electron beam is modulated with dot row data. At the end of the forward sweep, the CRT is blanked during the turn around time, and the electron beam travels along dotted line 216 to come into vertical alignment with green phosphor stripe 204. A reverse sweep then begins.

The electron beam then travels horizontally along dotted line 218 in a reverse direction across green phosphor stripe 204 on CRT fiber optic faceplate 124 during which the CRT is unblanked and modulated with dot row data. At the end of the reverse sweep, the CRT is blanked during the turn around time, and the electron beam travels along dotted line 220 to come into vertical alignment with blue phosphor stripe 206. A forward sweep then begins.

The electron beam then travels horizontally along dotted line 222 in a forward direction across blue phosphor stripe 206 on CRT fiber optic faceplate 124 during which the CRT is unblanked and modulated with dot row data. At the end of the forward sweep, the CRT is blanked during the turn around time, and the electron beam travels along dotted line 224 to come into vertical alignment with green phosphor stripe 204. A reverse sweep then begins.

The electron beam then travels horizontally along dotted line 226 in a reverse direction across green phosphor stripe 204 on CRT fiber optic faceplate 124 during which the CRT is unblanked and modulated with dot row data. At the end of the reverse sweep, the CRT is blanked during the turn around time, and the electron beam travels along dotted line 228 to come into vertical alignment with red phosphor stripe 202. A forward sweep then begins.

The electron beam then travels horizontally along dotted line 230 in a forward direction across red phosphor stripe 202 on CRT fiber optic faceplate 124 during which the CRT is unblanked and modulated with dot row data. At the end of the forward sweep, the CRT is blanked during the turn around time, and the electron beam travels along dotted line 232 to come into vertical alignment with blue phosphor stripe 206. A reverse sweep then begins.

The electron beam then travels horizontally along dotted line 234 in a reverse direction across blue phosphor stripe 204 on CRT fiber optic faceplate 124 during which the CRT is unblanked and modulated with dot row data. At the end of the reverse sweep, the CRT is blanked during the turn around time, and the electron beam travels along dotted line 236 to come into vertical alignment with red phosphor stripe 202.

This completes the sweeping sequence pattern that is the preferred embodiment of the invention. This pattern consists of a forward sweep in red phosphor stripe 202, a reverse sweep in green phosphor stripe 204, a forward sweep in blue phosphor stripe 206, a reverse sweep in green phosphor stripe 204, a forward sweep in red phosphor stripe 202, and a reverse sweep in blue phosphor stripe 206. Thus, red phosphor stripe 202 is always swept in the forward direction, green phosphor stripe 204 is always swept in the reverse direction, and blue phosphor stripe 206 is swept alternately in the forward direction and the reverse direction. One skilled in the art will recognize that many variations upon this pattern are possible and will suggest themselves without departing from the scope of the present invention.

The sweeping sequence pattern continues until all of the dot row data for an image has been processed. Though two dotted lines are shown at two vertical positions in each color phosphor stripe, forward and reverse sweeps may be at the same vertical position, or in multiple vertical positions within each color phosphor stripe. Multiple vertical positions are utilized in the preferred embodiment of the invention in order to lengthen the life of CRT 116. Thus, two adjacent lines on medium 120 may not be exposed one after the other. A first line may be exposed at time one, and the line adjacent to it may be exposed at a subsequent time, after exposing other lines, in conjunction with moving medium 120 relative to CRT 116. An effective method for sweeping horizontally in multiple vertical positions within a phosphor stripe is disclosed in U.S. Pat. No. 5,184,154 issued to Kerry L. Shaklee on Feb. 2, 1993.

When all of the dot row data has been processed for an image, the electron beam may finish its last sweep of blue phosphor stripe 206 at ending position 238 after a final reverse sweep, or ending position 240 after a final forward sweep, depending upon the nature of the particular data for an image. If the final sweep ends at ending position 238, then the electron beam travels along dotted line 242 back to home position 210. If the final sweep ends at ending position 240, then the electron beam travels along dotted line 244 back to home position 210. The electron beam is blanked when traveling along either dotted line 242 or dotted line 244.

Bi-directional sweeping of the present invention eliminates the hold periods associated with unidirectional sweeps and the need for a retrace after every unidirectional sweep, thus increasing print speed. By keeping the CRT electron beam in home position 210 during idle periods between printing images, exposure leak is prevented because the CRT electron beam is kept outside of any of the color phosphor stripes, thus the CRT electron beam is incapable of exposing the medium. Also, since the CRT electron beam is in the center of the CRT, power dissipation within the horizontal amplifiers is significantly reduced, thus minimizing thermal dissipation requirements of the deflection amplifiers.

In addition to CRT 116 with CRT fiber optic faceplate 124 described above, which is the preferred embodiment of the invention, the CRT used may be a three electron gun CRT that illuminates multiple phosphor color triads on the surface of the CRT screen, or the CRT may be of the Trinitron type, having one electron gun generating three electron beams which illuminate multiple vertical phosphor color stripes on the surface of the CRT screen. With such CRT's, the three electron beams sweep together across the surface of the CRT screen, with one electron beam only illuminating the red phosphor dots or stripes, a second electron beam only illuminating the green phosphor dots or stripes, and the third electron beam only illuminating the blue phosphor dots or stripes. Thus, after a single horizontal sweep in a forward direction, with each electron beam being modulated with one row of dot row data, a single line on medium 120 has been exposed with all three colors. As the electron beams are swept in a reverse direction at a vertical position just below the previous position, and modulated with a next row of dot row data, a second line of medium 120 is exposed. This bi-directional sweeping continues down the screen of the CRT, exposing medium 120.

Figure 3:
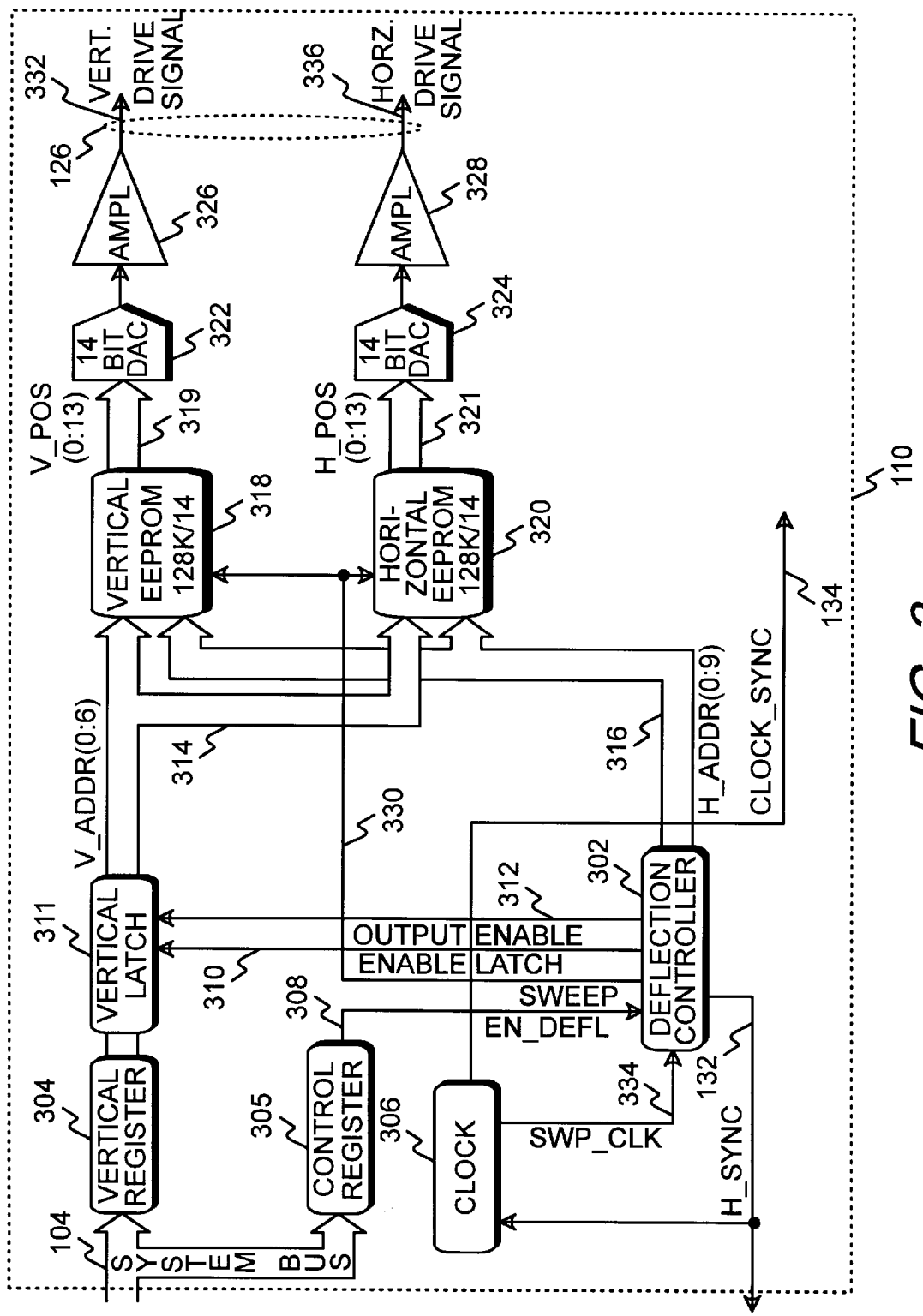
FIG. 3 shows a block diagram of the CRT scan drive system of FIG. 1.

FIG. 3 shows a block diagram of the CRT scan drive system of FIG. 1. Referring now to FIG. 3, CRT scan drive system 110 contains a deflection controller 302 which creates and outputs the data and control signals necessary to cause forward and reverse sweeps of the CRT electron beam, and to place the CRT electron beam into home position 210 (FIG. 2). Deflection controller 302 generates H_SYNC signal 132 (also shown in FIG. 1) and sends it to CRT data drive system 112 (FIG. 1) and a SWP_CLK signal 334 is generated from a clock 306 and sent to deflection controller 302. Clock 306 sends CLOCK_SYNC signal 134 (also shown in FIG. 1) to CRT data drive system 112.

A vertical register 304 receives a vertical address from control digital processing unit 102 (FIG. 1) over system bus 104 (also shown in FIG. 1). The vertical address is used to select a vertical position of the electron beam within one of the color phosphor stripes on the face of CRT 116 (FIG. 1). The vertical position of the CRT electron beam within a color phosphor stripe is changed periodically to lengthen the life of CRT 116. The vertical position value is transferred to vertical latch 311 by enable latch signal 310 output from deflection controller 302. The output V_ADDR bus 314 of the vertical latch 311 is a seven bit bus that is connected to a vertical EEPROM 318. V_ADDR bus 314 also connects to a horizontal EEPROM 320. Vertical EEPROM 318 and horizontal EEPROM 320 contain look up tables having rows of numbers that are fed to D to A converters that convert the numbers into voltages. For vertical EEPROM 318, the cells in each row of the table are filled with numerical values that establish a vertical position within a color phosphor stripe from which to move the CRT electron beam horizontally across the face of the CRT in a digital fashion. In the preferred embodiment of the invention, there are 13 to 19 vertical positions in each of the color phosphor stripes.

Figure 5:
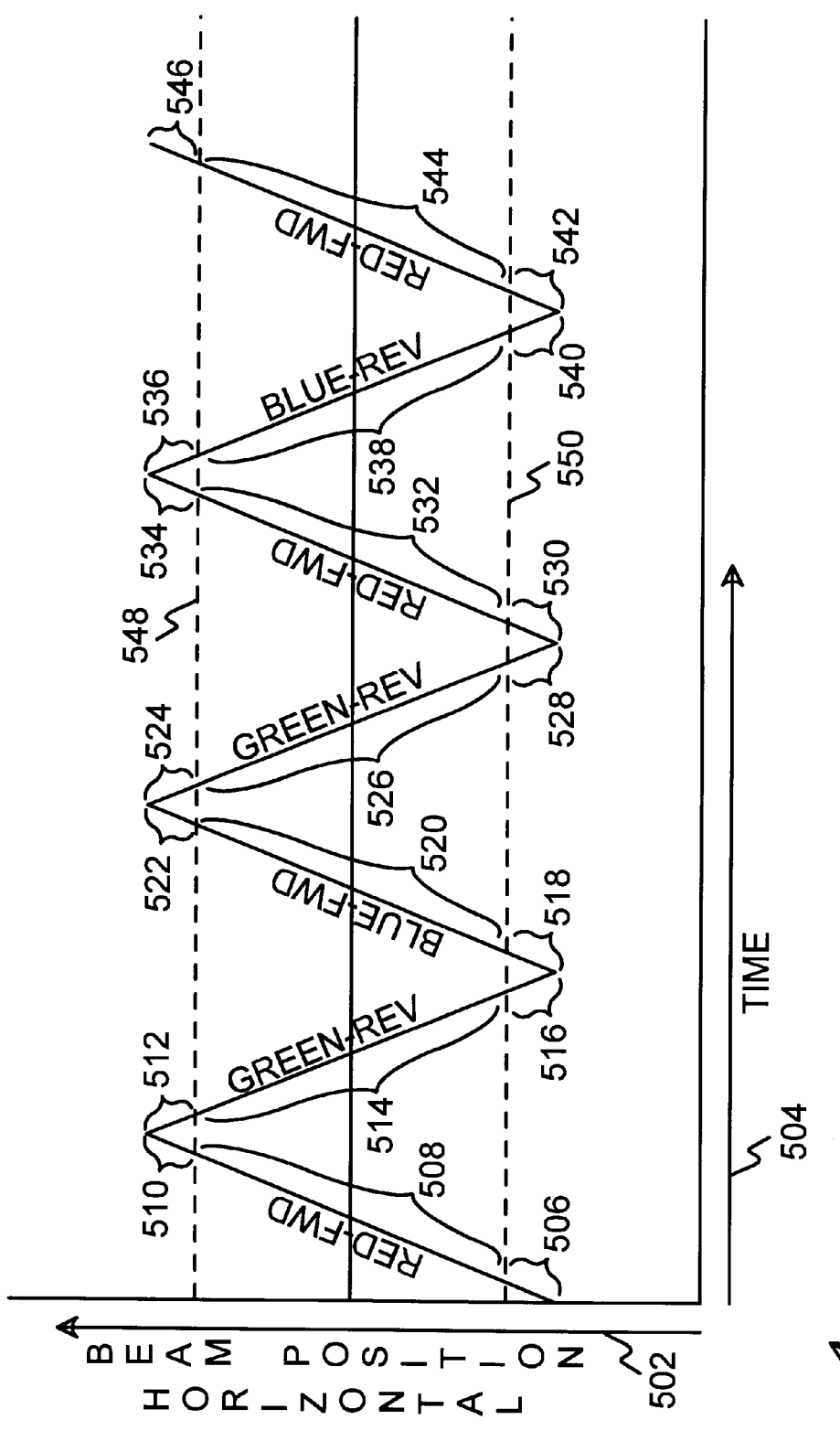
FIG. 5 shows a timing diagram of the CRT electron beam in forward and reverse sweep positions over time.

For horizontal EEPROM 320, the cells in each row of the table contain numerical values that drive the CRT electron beam at a constant velocity across the face of the CRT. A first row contains values for a forward sweep at a first vertical position. The next row contains values for a reverse sweep at the first vertical position. The next row contains values for a forward sweep at a second vertical position, and so on for the remaining rows. These values ensure that the dots that are exposed on medium 120 are aligned from row to row. There should be enough update values in each row of the horizontal look up table to compensate for the inertia of the electrical system to provide a smooth curve as shown in FIG. 5. In the preferred embodiment of the invention, 528 update values are used to move the CRT electron beam across the face of the CRT.

The output of deflection controller 302 is a ten bit H_ADDR bus 316 which is also connected to vertical EEPROM 318 and horizontal EEPROM 320. Deflection controller 302 also outputs a SWEEP signal 330 which indicates whether the CRT electron beam is sweeping in a forward direction or a reverse direction. SWEEP signal 330 is a logic 1 when the CRT electron beam is sweeping in a forward direction across the CRT, and is a logic 0 when the CRT electron beam is sweeping in a reverse direction across the CRT.

Data on the V_ADDR bus 314 and the H_ADDR bus 316 are converted by vertical EEPROM 318 into a fourteen bit vertical position signal V_POS 319 which is connected to a fourteen bit D to A converter 322. The output of D to A converter 322 is amplified by an amplifier 326 and connected through output signal 126 (also shown in FIG. 1) to the CRT vertical drive of CRT yoke 114. Data on the V_ADDR bus 314 and the H_ADDR bus 316 are also connected to horizontal EEPROM 320. Horizontal EEPROM 320 converts these two values into a fourteen bit horizontal position value H_POS 321 which is connected to a horizontal position fourteen bit D to A converter 324. The output of D to A converter 324 is amplified by amplifier 328 and connected through output signal 126 to the CRT horizontal drive of CRT yoke 114. The vertical drive signal 332 from amplifier 326 and the horizontal drive signal 336 from amplifier 328 form output signal 126 of the CRT scan drive system 110 (FIG. 1).

Vertical register 304, vertical latch 311, deflection controller 302, vertical EEPROM 318, and D to A converter 322 thus form a vertical deflection controller circuit which outputs a constant voltage vertical drive signal 332 to hold the electron beam at the same vertical position within the same color phosphor stripe during a sweep. Deflection controller 302, horizontal EEPROM 320, and D to A converter 324 thus form a horizontal sweep generator circuit which outputs horizontal drive signal 336, which is a substantially saw tooth current wave form, for driving the electron beam bi-directionally in forward and reverse directions across the color phosphor stripes at a constant velocity during the active exposure position of the sweep.

Figure 4:
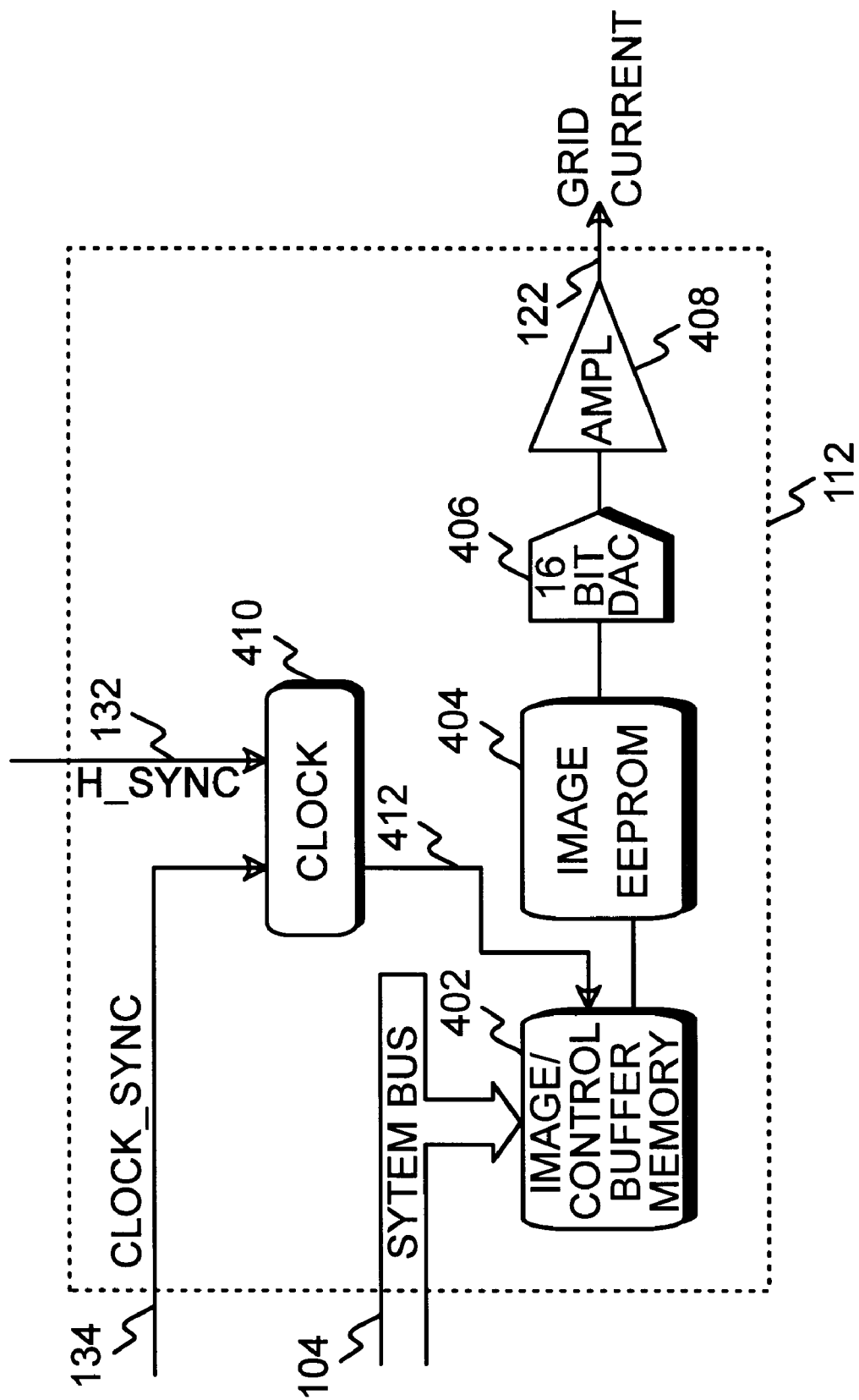
FIG. 4 shows a block diagram of the CRT data drive system of FIG. 1.

FIG. 4 shows a block diagram of the CRT data drive system of FIG. 1. Referring now to FIG. 4, CRT data drive system 112 is shown containing a image/control buffer memory 402. Control digital processing unit 102 (FIG. 1) takes the image data from host interface 106 and converts the image data into a series of rows of dot row data. This data is then sent to image/control buffer memory 402 through system bus 104 (also shown in FIG. 1). For low resolution image data, a line of image data may be repeated in several rows of dot row data to improve the appearance of the final image exposed on the medium.

When a phosphor row is being exposed by the CRT electron beam, the row of data is retrieved from image/control buffer memory 402 and sent to an image EEPROM 404, which translates the data for each position on the row into a number representative of the display intensity needed to expose medium 120 (FIG. 1) at this position. This number is then converted from a digital value to an analog value by D to A converter 406, amplified by amplifier 408, and output signal 122 (also shown in FIG. 1) is used to drive the grid of the CRT to control the intensity of the displayed position.

The order of the image data must be reversed for each reverse sweep. In one embodiment of the invention the image information is loaded into image/control buffer memory 402, in reverse order in every other row. Thus, when each row is retrieved for modulating the CRT electron beam, rows of data in forward order are retrieved for forward sweeps, and rows of data in reverse order are retrieved for reverse sweeps. In the preferred embodiment of the invention, the image data sent to image/control buffer memory 402 is loaded in forward order. As the image data is retrieved for modulating the CRT electron beam, every other row is read in reverse order for each reverse sweep according to SWEEP signal 330 (FIG. 3).

CLOCK_SYNC signal 134 (also shown in FIG. 1) is received in clock 410. Clock 410 also receives H_SYNC signal 132 (also shown in FIG. 1) from CRT scan drive system 110 (FIG. 1) to indicate that the CRT electron beam moving across the face of the CRT has reached the active data position and will begin exposing the medium. The output of clock 410 is clocked signal 412 which is sent to image/control buffer memory 402 to determine when to change pixel information. CLOCK_SYNC signal 134 and H_SYNC signal 132 synchronize the modulation of the CRT electron beam by CRT data drive system 112 with CRT scan drive system 110 at the beginning of each sweep. This ensures that each horizontal and vertical address in a sweep, in either forward or reverse direction controlled by CRT scan drive system 110, will receive the proper intensity from the CRT electron beam for that location from CRT data drive system 112.

FIG. 5 shows a timing diagram of the CRT electron beam in forward and reverse sweep positions over time. Referring now to FIG. 5, timing diagram 500 shows the horizontal beam position 502 against time 504, which is caused by the saw tooth voltage wave form generated by the horizontal sweep generator circuit. When a forward sweep starts, the CRT electron beam has a ramp up period 506 to overcome inertia. The CRT is blanked during ramp up period 506. The CRT electron beam then moves into a linear period 508 where it is swept across the face of the CRT in red phosphor stripe 202 (FIG. 2) in a forward direction at a constant velocity. The CRT is unblanked during linear period 508 to expose medium 120 (FIG. 1). The CRT electron beam then moves into a ramp down period 510 to bring the CRT electron beam to a stop. The CRT is blanked during ramp down period 510. This completes a forward sweep.

A reverse sweep starts with ramp up period 512 in which the CRT remains blanked. The CRT electron beam then moves into a linear period 514 where it is swept across the face of the CRT in green phosphor stripe 204 (FIG. 2) in a reverse direction at a constant velocity. The CRT is unblanked during linear period 514 to expose medium 120. The CRT electron beam then moves into ramp down period 516 to bring the CRT electron beam to a stop. The CRT is blanked during this period. This completes a reverse sweep across the face of the CRT.

The next forward sweep starts with a ramp up period 518 in which the CRT remains blanked. The CRT electron beam then moves into a linear period 520 where it is swept across the face of the CRT in blue phosphor stripe 206 (FIG. 2) in a forward direction at a constant velocity. The CRT is unblanked during linear period 520 to expose medium 120. The CRT electron beam then moves into a ramp down period 522 to bring the CRT electron beam to a stop. The CRT is blanked during ramp down period 522. This completes a forward sweep.

A reverse sweep starts with ramp up period 524 in which the CRT remains blanked. The CRT electron beam then moves into a linear period 526 where it is swept across the face of the CRT in green phosphor stripe 204 in a reverse direction at a constant velocity. The CRT is unblanked during linear period 526 to expose medium 120. The CRT electron beam then moves into ramp down period 528 to bring the CRT electron beam to a stop. The CRT is blanked during this period. This completes a reverse sweep across the face of the CRT.

The next forward sweep starts with a ramp up period 530 in which the CRT remains blanked. The CRT electron beam then moves into a linear period 532 where it is swept across the face of the CRT in red phosphor stripe 202 in a forward direction at a constant velocity. The CRT is unblanked during linear period 532 to expose medium 120. The CRT electron beam then moves into a ramp down period 534 to bring the CRT electron beam to a stop. The CRT is blanked during ramp down period 534. This completes a forward sweep.

A reverse sweep starts with ramp up period 536 in which the CRT remains blanked. The CRT electron beam then moves into a linear period 538 where it is swept across the face of the CRT in blue phosphor stripe 206 in a reverse direction at a constant velocity. The CRT is unblanked during linear period 538 to expose medium 120. The CRT electron beam then moves into ramp down period 540 to bring the CRT electron beam to a stop. The CRT is blanked during this period. This completes a reverse sweep across the face of the CRT.

This completes the sweep sequence pattern which, in conjunction with moving medium 120 in relation to CRT 116, is repeated until all the image data has been processed to expose medium 120 with the desired image.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for bi-directionally sweeping an electron beam of a color CRT, to illuminate a plurality of color phosphor areas on a face of said color CRT, and to expose a photosensitive medium with light emitted from said face of said color CRT, said method comprising:

(a) aligning a first line of said photosensitive medium with a first vertical position in a first color phosphor area on said face of said color CRT;

(b) positioning said electron beam at said first vertical position in said first color phosphor area on said face of said color CRT;

(c) sweeping said electron beam horizontally inside said first color phosphor area in a forward direction at said first vertical position;

(d) modulating said electron beam, during said sweeping of step (c), with a first row of dot row data for said first color phosphor area derived from an image, wherein said first row of dot row data is processed in a forward order;

(e) exposing said first line of said photosensitive medium during said sweeping and modulating of steps (c) and (d);

(f) aligning said first line of said photosensitive medium with a first vertical position in a second color phosphor area on said face of said color CRT;

(g) positioning said electron beam at said first vertical position in said second color phosphor area on said face of said color CRT;

(h) sweeping said electron beam horizontally inside said second color phosphor area in a reverse direction at said first vertical position in said second color phosphor area, wherein said reverse direction is opposite said forward direction;

(i) modulating said electron beam, during said sweeping of step (h), with a second row of dot row data for said second color phosphor area derived from said image, wherein said second row of dot row data is processed in a reverse order opposite said forward order; and (j) exposing said first line of said photosensitive medium during said sweeping and modulating of steps (h) and (i).

2. The method for bi-directionally sweeping an electron beam of a color CRT, to illuminate a plurality of color phosphor areas on a face of said color CRT, and to expose a photosensitive medium with light emitted from said face of said color CRT according to claim 1, further comprising the steps of:

(k) aligning said first line of said photosensitive medium with a first vertical position in a third color phosphor area on said face of said color CRT;

(l) positioning said electron beam at said first vertical position in said third color phosphor area on said face of said color CRT;

(m) sweeping said electron beam horizontally inside said third color phosphor area in said forward direction at said first vertical position in said third color phosphor area;

(n) modulating said electron beam, during said sweeping of step (m), with a third row of dot row data for said third color phosphor area derived from said image, wherein said third row of dot row data is processed in said forward order;

(o) exposing said first line of said photosensitive medium during said sweeping and modulating of steps (m) and (n);

(p) aligning a second line of said photosensitive medium with said first vertical position in said first color phosphor area on said face of said color CRT;

(q) positioning said electron beam at said first vertical position in said first color phosphor area on said face of said color CRT;

(r) sweeping said electron beam horizontally inside said first color phosphor area in said reverse direction at said first vertical position;

(s) modulating said electron beam, during said sweeping of step (r), with a fourth row of dot row data for said first color phosphor area derived from said image, wherein said fourth row of dot row data is processed in said reverse order;

(t) exposing said second line of said photosensitive medium during said sweeping and modulating of steps (r) and (s);

(u) aligning said second line of said photosensitive medium with said first vertical position in said second color phosphor area on said face of said color CRT;

(v) positioning said electron beam at said first vertical position in said second color phosphor area on said face of said color CRT;

(w) sweeping said electron beam horizontally inside said second color phosphor area in said forward direction at said first vertical position in said second color phosphor area;

(x) modulating said electron beam, during said sweeping of step (w), with a fifth row of dot row data for said second color phosphor area derived from said image, wherein said fifth row of dot row data is processed in said forward order;

(y) exposing said second line of said photosensitive medium during said sweeping and modulating of steps (w) and (x);

(z) aligning said second line of said photosensitive medium with said first vertical position in said third color phosphor area on said face of said color CRT;

(aa) positioning said electron beam at said first vertical position in said third color phosphor area on said face of said color CRT;

(ab) sweeping said electron beam horizontally inside said third color phosphor area in said reverse direction at said first vertical position in said third color phosphor area;

(ac) modulating said electron beam, during said sweeping of step (ab), with a sixth row of dot row data for said third color phosphor area derived from said image, wherein said sixth row of dot row data is processed in said reverse order; and (ad) exposing said second line of said photosensitive medium during said sweeping and modulating of steps (ab) and (ac).

3. The method for bi-directionally sweeping an electron beam of a color CRT, to illuminate a plurality of color phosphor areas on a face of said color CRT, and to expose a photosensitive medium with light emitted from said face of said color CRT according to claim 2, wherein step (c) further comprises step (C0) performed before step (c) and step (c1) performed after step (c), step (h) further comprises step (h0) performed before step (h) and step (h1) performed after step (h), step (m) further comprises step (m0) performed before step (m) and step (m1) performed after step (m), step (r) further comprises step (r0) performed before step (r) and step (r1) performed after step (r), step (w) further comprises step (w0) performed before step (w) and step (w1) performed after step (w), and step (ab) further comprises step (ab0) performed before step (ab) and step (ab1) performed after step (ab0):

(c0) unblanking said color CRT;

(c1) blanking said color CRT at the end of said sweeping of step (c);

(h0) unblanking said color CRT;

(h1) blanking said color CRT at the end of said sweeping of step (h);

(m0) unblanking said color CRT;

(m1) blanking said color CRT at the end of said sweeping of step (m);

(r0) unblanking said color CRT;

(r1) blanking said color CRT at the end of said sweeping of step (r);

(w0) unblanking said color CRT;

(w1) blanking said color CRT at the end of said sweeping of step (w);

(ab0) unblanking said color CRT; and (ab1) blanking said color CRT at the end of said sweeping of step (f).

4. The method for bi-directionally sweeping an electron beam of a color CRT, to illuminate a plurality of color phosphor areas on a face of said color CRT, and to expose a photosensitive medium with light emitted from said face of said color CRT according to claim 2, wherein step (a) further comprises the step (a0) performed before step (a):

(a0) processing image data from said image and breaking it up into a plurality of rows of dot row data.

5. The method for bi-directionally sweeping an electron beam of a color CRT, to illuminate a plurality of color phosphor areas on a face of said color CRT, and to expose a photosensitive medium with light emitted from said face of said color CRT according to claim 4 wherein step (a0) further comprises the step (a0a) and steps (i), (s), and (ac) are replaced by the following new steps (i), (s), and (ac):

(a0a) reversing the order of said image data in every other row of said plurality of rows of dot row data;

(i) modulating said electron beam, during said sweeping of step (h), with a second row of dot row data for said second color phosphor area derived from said image, wherein said second row of dot row data is processed in said forward order;

(s) modulating said electron beam, during said sweeping of step (r), with a fourth row of dot row data for said first color phosphor area derived from said image, wherein said fourth row of dot row data is processed in said forward order; and (ac) modulating said electron beam, during said sweeping of step (ab), with a sixth row of dot row data for said third color phosphor area derived from said image, wherein said sixth row of dot row data is processed in said forward order.

6. The method for bi-directionally sweeping an electron beam of a color CRT, to illuminate a plurality of color phosphor areas on the face of said color CRT, and to expose a photosensitive medium with light emitted from said face of said color CRT according to claim 2, wherein steps (b), (g), (l), (q), (v), and (aa) further comprise the steps (b1), (g1), (l1), (q1), (v1), and (aa1):

(b1) positioning said electron beam at a left most end of said first color phosphor area on said face of said color CRT at said first vertical position;

(g1) positioning said electron beam at a right most end of said second color phosphor area on said face of said color CRT at said first vertical position;

(l1) positioning said electron beam at a left most end of said third color phosphor area on said face of said color CRT at said first vertical position;

(q1) positioning said electron beam at a right most end of said first color phosphor area on said face of said color CRT at said first vertical position;

(v1) positioning said electron beam at a left most end of said second color phosphor area on said face of said color CRT at said first vertical position; and (aa1) positioning said electron beam at a right most end of said third color phosphor area on said face of said color CRT at said first vertical position.

7. The method for bi-directionally sweeping an electron beam of a color CRT, to illuminate a plurality of color phosphor areas on the face of said color CRT, and to expose a photosensitive medium with light emitted from said face of said color CRT according to claim 2, wherein step (c) further comprises step (c1), step (d) further comprises steps (d1) and (d2), step (h) further comprises step (h1), step (i) further comprises steps (i1) and (i2), step (m) further comprises step (m1), step (n) further comprises steps (n1) and (n2), step (r) further comprises step (r1), step (s) further comprises steps (s1) and (s2), step (w) further comprises step (w1), step (x) further comprises steps (x1) and (x2), step (ab) further comprises step (ab1), and step (ac) further comprises steps (ac1) and (ac2):

(c1) driving said sweeping of said electron beam in said forward direction of step (c) with a first clock;

(d1) controlling said modulation of said electron beam with said first row of dot row data during said sweeping of step (c) with a second clock;

(d2) synchronizing said first clock with said second clock at the beginning of said sweeping and modulating of steps (c) and (d);

(h1) driving said sweeping of said electron beam in said reverse direction of step (h) with said first clock;

(i1) controlling said modulation of said electron beam with said second row of dot row data during said sweeping of step (h) with said second clock;

(i2) synchronizing said first clock with said second clock at the beginning of said sweeping and modulating of steps (h) and (i);

(m1) driving said sweeping of said electron beam in said forward direction of step (m) with said first clock;

(n1) controlling said modulation of said electron beam with said third row of dot row data during said sweeping of step (m) with said second clock;

(n2) synchronizing said first clock with said second clock at the beginning of said sweeping and modulating of steps (m) and (n);

(r1) driving said sweeping of said electron beam in said reverse direction of step (r) with said first clock;

(s1) controlling said modulation of said electron beam with said fourth row of dot row data during said sweeping of step (s) with said second clock;

(s2) synchronizing said first clock with said second clock at the beginning of said sweeping and modulating of steps (r) and (s);

(w1) driving said sweeping of said electron beam in said forward direction of step (w) with said first clock;

(x1) controlling said modulation of said electron beam with said fifth row of dot row data during said sweeping of step (x) with said second clock;

(x2) synchronizing said first clock with said second clock at the beginning of said sweeping and modulating of steps (w) and (x);

(ab1) driving said sweeping of said electron beam in said reverse direction of step (ab) with said first clock;

(ac1) controlling said modulation of said electron beam with said sixth row of dot row data during said sweeping of step (ac) with said second clock; and (ac2) synchronizing said first clock with said second clock at the beginning of said sweeping and modulating of steps (ab) and (ac).

8. The method for bi-directionally sweeping an electron beam of a color CRT, to illuminate a plurality of color phosphor areas on the face of said color CRT, and to expose a photosensitive medium with light emitted from said face of said color CRT according to claim 2, wherein said photosensitive medium is immediately adjacent to said face of said color CRT.

9. The method for bi-directionally sweeping an electron beam of a color CRT, to illuminate a plurality of color phosphor areas on the face of said color CRT, and to expose a photosensitive medium with light emitted from said face of said color CRT according to claim 2, wherein said light emitted from said face of said color CRT passes through at least one lens before exposing said photosensitive medium.

10. The method for bi-directionally sweeping an electron beam of a color CRT, to illuminate a plurality of color phosphor areas on a face of said color CRT, and to expose a photosensitive medium with light emitted from said face of said color CRT according to claim 2, further comprising the steps of:

(ae) repeating steps (a) through (ad) for a plurality of additional lines of said photosensitive medium, wherein each of said plurality of additional lines of said photosensitive medium is first aligned with said first vertical position in said first color phosphor area and then aligned with said first vertical position in said second color phosphor area and then aligned with said first vertical position in said third color phosphor area on said face of said color CRT, and further wherein said electron beam is modulated with a plurality of additional rows of dot row data derived from said image for exposing said plurality of additional lines of said photosensitive medium until all of said additional rows of dot row data derived from said image have been processed; and (af) repeating step (ae) for a plurality of images.

11. The method for bi-directionally sweeping an electron beam of a color CRT, to illuminate a plurality of color phosphor areas on the face of said color CRT, and to expose a photosensitive medium with light emitted from said face of said color CRT according to claim 10, wherein step (ae) further comprises steps (ae1) and (ae2):

(ae1) blanking said color CRT when said image is complete; and (ae2) parking said electron beam in a home position.

12. The method for bi-directionally sweeping an electron beam of a color CRT, to illuminate a plurality of color phosphor areas on a face of said color CRT, and to expose a photosensitive medium with light emitted from said face of said color CRT according to claim 2, further comprising the step of:

(ae) repeating steps (a) through (ad) for a plurality of additional lines of said photosensitive medium, wherein each of said plurality of additional lines of said photosensitive medium is first aligned with a second vertical position in said first color phosphor area and then aligned with a second vertical position in said second color phosphor area and then aligned with a second vertical position in said third color phosphor area on said face of said color CRT, and further wherein said electron beam is modulated with a plurality of additional rows of dot row data derived from said image for exposing said plurality of additional lines of said photosensitive medium until all of said additional rows of dot row data derived from said image have been processed; and (af) repeating step (ae) for a plurality of images.

13. The method for bi-directionally sweeping an electron beam of a color CRT, to illuminate a plurality of color phosphor areas on a face of said color CRT, and to expose a photosensitive medium with light emitted from said face of said color CRT according to claim 2, wherein steps (p), (q), (r), (s), (u), (v), (w) and (x) are replaced by the following new steps (p), (q), (r), (s), (u), (v), (w), and (x):

(p) aligning a second line of said photosensitive medium with said first vertical position in said second color phosphor area on said face of said color CRT;

(q) positioning said electron beam at said first vertical position in said second color phosphor area on said face of said color CRT;

(r) sweeping said electron beam horizontally inside said second color phosphor area in said reverse direction at said first vertical position;

(s) modulating said electron beam, during said sweeping of step (r), with a fourth row of dot row data for said second color phosphor area derived from said image, wherein said fourth row of dot row data is processed in said reverse order;

(u) aligning said second line of said photosensitive medium with said first vertical position in said first color phosphor area on said face of said color CRT;

(v) positioning said electron beam at said first vertical position in said first color phosphor area on said face of said color CRT;

(w) sweeping said electron beam horizontally inside said first color phosphor area in said forward direction at said first vertical position in said first color phosphor area, and (x) modulating said electron beam, during said sweeping of step (w), with a fifth row of dot row data for said first color phosphor area derived from said image, wherein said fifth row of dot row data is processed in said forward order.

14. The method for bi-directionally sweeping an electron beam of a color CRT, to illuminate a plurality of color phosphor areas on a face of said color CRT, and to expose a photosensitive medium with light emitted from said face of said color CRT according to claim 13, wherein step (c) further comprises step (c0) performed before step (c) and step (c1) performed after step (c), step (h) further comprises step (h0) performed before step (h) and step (h1) performed after step (h), step (m) further comprises step (m0) performed before step (m) and step (m1) performed after step (m), step (r) further comprises step (r0) performed before step (r) and step (r1) performed after step (r), step (w) further comprises step (w0) performed before step (w) and step (w1) performed after step (w), and step (ab) further comprises step (ab0) performed before step (ab) and step (ab1) performed after step (ab0):

(c0) unblanking said color CRT;

(c1) blanking said color CRT at the end of said sweeping of step (c);

(h0) unblanking said color CRT;

(h1) blanking said color CRT at the end of said sweeping of step (h);

(m0) unblanking said color CRT;

(m1) blanking said color CRT at the end of said sweeping of step (m);

(r0) unblanking said color CRT;

(r1) blanking said color CRT at the end of said sweeping of step (r);

(w0) unblanking said color CRT;

(w1) blanking said color CRT at the end of said sweeping of step (w);

(ab0) unblanking said color CRT; and (ab1) blanking said color CRT at the end of said sweeping of step (f).

15. The method for bi-directionally sweeping an electron beam of a color CRT, to illuminate a plurality of color phosphor areas on a face of said color CRT, and to expose a photosensitive medium with light emitted from said face of said color CRT according to claim 13, wherein step (a) further comprises the step (a0) performed before step (a):

(a0) processing image data from said image and breaking it up into a plurality of rows of dot row data.

16. The method for bi-directionally sweeping an electron beam of a color CRT, to illuminate a plurality of color phosphor areas on a face of said color CRT, and to expose a photosensitive medium with light emitted from said face of said color CRT according to claim 15 wherein step (a0) further comprises the step (a0a) and steps (i), (s), and (ac) are replaced by the following new steps (i), (s), and (ac):

(a0a) reversing the order of said image data in every other row of said plurality of rows of dot row data;

(i) modulating said electron beam, during said sweeping of step (h), with a second row of dot row data for said second color phosphor area derived from said image, wherein said second row of dot row data is processed in said forward order;

(s) modulating said electron beam, during said sweeping of step (r), with a fourth row of dot row data for said second color phosphor area derived from said image, wherein said fourth row of dot row data is processed in said forward order; and (ac) modulating said electron beam, during said sweeping of step (ab), with a sixth row of dot row data for said third color phosphor area derived from said image, wherein said sixth row of dot row data is processed in said forward order.

17. The method for bi-directionally sweeping an electron beam of a color CRT, to illuminate a plurality of color phosphor areas on the face of said color CRT, and to expose a photosensitive medium with light emitted from said face of said color CRT according to claim 13, wherein steps (b), (g), (l), (q), (v), and (aa) further comprise the steps (b1), (g1), (l1), (q1), (v1), and (aa1):

(b1) positioning said electron beam at a left most end of said first color phosphor area on said face of said color CRT at said first vertical position;

(g1) positioning said electron beam at a right most end of said second color phosphor area on said face of said color CRT at said first vertical position;

(l1) positioning said electron beam at a left most end of said third color phosphor area on said face of said color CRT at said first vertical position;

(q1) positioning said electron beam at a right most end of said second color phosphor area on said face of said color CRT at said first vertical position;

(v1) positioning said electron beam at a left most end of said first color phosphor area on said face of said color CRT at said first vertical position; and (aa1) positioning said electron beam at a right most end of said third color phosphor area on said face of said color CRT at said first vertical position.

18. The method for bi-directionally sweeping an electron beam of a color CRT, to illuminate a plurality of color phosphor areas on the face of said color CRT, and to expose a photosensitive medium with light emitted from said face of said color CRT according to claim 13, wherein step (c) further comprises step (c1), step (d) further comprises steps (d1) and (d2), step (h) further comprises step (h1), step (i) further comprises steps (i1) and (i2), step (m) further comprises step (m1), step (n) further comprises steps (n1) and (n2), step (r) further comprises step (r1), step (s) further comprises steps (s1) and (s2), step (w) further comprises step (w1), step (x) further comprises steps (x1) and (x2), step (ab) further comprises step (ab1), and step (ac) further comprises steps (ac1) and (ac2):

(c1) driving said sweeping of said electron beam in said forward direction of step (c) with a first clock;

(d1) controlling said modulation of said electron beam with said first row of dot row data during said sweeping of step (c) with a second clock;

(d2) synchronizing said first clock with said second clock at the beginning of said sweeping and modulating of steps (c) and (d);

(h1) driving said sweeping of said electron beam in said reverse direction of step (h) with said first clock;

(i1) controlling said modulation of said electron beam with said second row of dot row data during said sweeping of step (h) with said second clock;

(i2) synchronizing said first clock with said second clock at the beginning of said sweeping and modulating of steps (h) and (i);

(m1) driving said sweeping of said electron beam in said forward direction of step (m) with said first clock;

(n1) controlling said modulation of said electron beam with said third row of dot row data during said sweeping of step (m) with said second clock;

(n2) synchronizing said first clock with said second clock at the beginning of said sweeping and modulating of steps (m) and (n);

(r1) driving said sweeping of said electron beam in said reverse direction of step (r) with said first clock;

(s1) controlling said modulation of said electron beam with said fourth row of dot row data during said sweeping of step (s) with said second clock;

(s2) synchronizing said first clock with said second clock at the beginning of said sweeping and modulating of steps (r) and (s);

(w1) driving said sweeping of said electron beam in said forward direction of step (w) with said first clock;

(x1) controlling said modulation of said electron beam with said fifth row of dot row data during said sweeping of step (x) with said second clock;

(x2) synchronizing said first clock with said second clock at the beginning of said sweeping and modulating of steps (w) and (x);

(ab1) driving said sweeping of said electron beam in said reverse direction of step (ab) with said first clock;

(ac1) controlling said modulation of said electron beam with said sixth row of dot row data during said sweeping of step (ac) with said second clock; and (ac2) synchronizing said first clock with said second clock at the beginning of said sweeping and modulating of steps (ab) and (ac).

19. The method for bi-directionally sweeping an electron beam of a color CRT, to illuminate a plurality of color phosphor areas on the face of said color CRT, and to expose a photosensitive medium with light emitted from said face of said color CRT according to claim 13, wherein said photosensitive medium is immediately adjacent to said face of said color CRT.

20. The method for bi-directionally sweeping an electron beam of a color CRT, to illuminate a plurality of color phosphor areas on the face of said color CRT, and to expose a photosensitive medium with light emitted from said face of said color CRT according to claim 13, wherein said light emitted from said face of said color CRT passes through at least one lens before exposing said photosensitive medium.

21. The method for bi-directionally sweeping an electron beam of a color CRT, to illuminate a plurality of color phosphor areas on the face of said color CRT, and to expose a photosensitive medium with light emitted from said face of said color CRT according to claim 13, wherein step (ae) further comprises steps (ae1) and (ae2):

(ae1) blanking said color CRT when said image is complete; and (ae2) parking said electron beam in a home position.

22. The method for bi-directionally sweeping an electron beam of a color CRT, to illuminate a plurality of color phosphor areas on a face of said color CRT, and to expose a photosensitive medium with light emitted from said face of said color CRT according to claim 13, further comprising the step of:

(ae) repeating steps (a) through (ad) for a plurality of additional lines of said photosensitive medium, wherein for each pair of additional lines of said plurality of additional lines of said photosensitive medium, the first of said each pair of additional lines is first aligned with said first vertical position in said first color phosphor area and then aligned with said first vertical position in said second color phosphor area and then aligned with said first vertical position in said third color phosphor area on said face of said color CRT, and the second of said each pair of additional lines is first aligned with said first vertical position in said second color phosphor area and then aligned with said first vertical position in said first color phosphor area and then aligned with said first vertical position in said third color phosphor area on said face of said color CRT, and further wherein said electron beam is modulated with a plurality of additional rows of dot row data derived from said image for exposing said plurality of additional lines of said photosensitive medium until all of said additional rows of dot row data derived from said image have been processed; and (af) repeating step (ae) for a plurality of images.

23. The method for bi-directionally sweeping an electron beam of a color CRT, to illuminate a plurality of color phosphor areas on a face of said color CRT, and to expose a photosensitive medium with light emitted from said face of said color CRT according to claim 13, further comprising the step of:

(ae) repeating steps (a) through (ad) for a plurality of additional lines of said photosensitive medium, for each pair of additional lines of said plurality of additional lines of said photosensitive medium, the first of said each pair of additional lines is first aligned with a second vertical position in said first color phosphor area and then aligned with a second vertical position in said second color phosphor area and then aligned with a second vertical position in said third color phosphor area on said face of said color CRT, and the second of said each pair of additional lines is first aligned with said second vertical position in said second color phosphor area and then aligned with said second vertical position in said first color phosphor area and then aligned with said second vertical position in said third color phosphor area on said face of said color CRT, and further wherein said electron beam is modulated with a plurality of additional rows of dot row data derived from said image for exposing said plurality of additional lines of said photosensitive medium until all of said additional rows of dot row data derived from said image have been processed; and (af) repeating step (ae) for a plurality of images.

24. The method for bi-directionally sweeping an electron beam of a color CRT, to illuminate a plurality of color phosphor areas on a face of said color CRT, and to expose a photosensitive medium with light emitted from said face of said color CRT according to claim 13, wherein steps (f), (k), (u), and (z) are eliminated, steps (j), (o), (p), (t), and (ad) are replaced by the following new steps (j), (o), (p), (t), and (ad), and further comprises the steps of (ae) through (aq):

(j) exposing a second line of said photosensitive medium, wherein said second line is aligned with said first vertical position in said second color phosphor area, during said sweeping and modulating of steps (h) and (i);

(o) exposing a third line of said photosensitive medium, wherein said third line is aligned with said first vertical position in said third color phosphor area, during said sweeping and modulating of steps (m) and (n);

(p) aligning said second line of said photosensitive medium with said first vertical position in said first color phosphor area on said face of said color CRT;

(t) exposing said third line of said photosensitive medium during said sweeping and modulating of steps (r) and (s);

(ad) exposing a fourth line of said photosensitive medium, wherein said fourth line is aligned with said first vertical position in said third color phosphor area, during said sweeping and modulating of steps (ab) and (ac);

(ae) aligning said third line of said photosensitive medium with said first vertical position in said first color phosphor area on said face of said color CRT;

(af) positioning said electron beam at said first vertical position in said first color phosphor area on said face of said color CRT;

(ag) sweeping said electron beam horizontally inside said first color phosphor area in said forward direction at said first vertical position in said first color phosphor area;

(ah) modulating said electron beam, during said sweeping of step (ag), with a seventh row of dot row data derived from said image, wherein said seventh row of dot row data is processed in said forward order;

(ai) exposing said third line of said photosensitive medium during said sweeping and modulating of steps (af) and (ag);

(aj) positioning said electron beam at said first vertical position in said second color phosphor area on said face of said color CRT;

(ak) sweeping said electron beam horizontally inside said second color phosphor area in said reverse direction at said first vertical position in said second color phosphor area;

(al) modulating said electron beam, during said sweeping of step (ak), with an eighth row of dot row data derived from said image, wherein said eighth row of dot row data is processed in said reverse order;

(am) exposing said fourth line of said photosensitive medium during said sweeping and modulating of steps (ak) and (al);

(an) positioning said electron beam at said first vertical position in said third color phosphor area on said face of said color CRT;

(ao) sweeping said electron beam horizontally inside said third color phosphor area in said forward direction at said first vertical position in said third color phosphor area;

(ap) modulating said electron beam, during said sweeping of step (ao), with a ninth row of dot row data derived from said image, wherein said ninth row of dot row data is processed in said forward order; and (aq) exposing a fifth line of said photosensitive medium, wherein said fifth line is aligned with said first vertical position in said third color phosphor area, during said sweeping and modulating of steps (ao) and (ap).

25. The method for bi-directionally sweeping an electron beam of a color CRT, to illuminate a plurality of color phosphor areas on a face of said color CRT, and to expose a photosensitive medium with light emitted from said face of said color CRT according to claim 24 further comprising the step of:

(ar) repeating steps (p) through (aq) for a plurality of additional lines of said photosensitive medium, wherein each of said plurality of additional lines of said photosensitive medium is first aligned with said first vertical position in said third color phosphor area on said face of said color CRT for said repeat of steps (p) through (ad), and then aligned with said first vertical position in said second color phosphor area on said face of said color CRT for a next said repeat of steps (ae) through (aq), and then aligned with said first vertical position in said first color phosphor area on said face of said color CRT for a next said repeat of steps (p) through (ad), and further wherein said electron beam is modulated with a plurality of additional rows of dot row data derived from said image for exposing said plurality of additional lines of said photosensitive medium until all of said additional rows of dot row data derived from said image have been processed; and (as) repeating step (ar) for a plurality of images.

26. The method for bi-directionally sweeping an electron beam of a color CRT, to illuminate a plurality of color phosphor areas on a face of said color CRT, and to expose a photosensitive medium with light emitted from said face of said color CRT according to claim 24, wherein steps (p) and (ae) are eliminated, step (a) further comprises the step (a1), and steps (e), (j), (o), (t), (y), (ad), (ai), (am), and (aq) are replaced by the following new steps (e), (j), (o), (t), (y), (ad), (ai), (am), and (aq):

(a1) moving said photosensitive medium continuously during steps (b) through (aq);

(e) exposing said first line of said photosensitive medium, wherein said first line is substantially aligned with said first vertical position in said first color phosphor area, during said sweeping and modulating of steps (c) and (d);

(j) exposing a second line of said photosensitive medium, wherein said second line is substantially aligned with said first vertical position in said second color phosphor area, during said sweeping and modulating of steps (h) and (i);

(o) exposing a third line of said photosensitive medium, wherein said third line is substantially aligned with said first vertical position in said third color phosphor area, during said sweeping and modulating of steps (m) and (n);

(t) exposing said third line of said photosensitive medium, wherein said third line is substantially aligned with said first vertical position in said second color phosphor area, during said sweeping and modulating of steps (r) and (s);

(y) exposing said second line of said photosensitive medium, wherein said second line is substantially aligned with said first vertical position in said first color phosphor area, during said sweeping and modulating of steps (w) and (x);

(ad) exposing a fourth line of said photosensitive medium, wherein said fourth line is substantially aligned with said first vertical position in said third color phosphor area, during said sweeping and modulating of steps (ab) and (ac);

(ai) exposing said third line of said photosensitive medium, wherein said third line is substantially aligned with said first vertical position in said first color phosphor area, during said sweeping and modulating of steps (af) and (ag);

(am) exposing said fourth line of said photosensitive medium, wherein said fourth line is substantially aligned with said first vertical position in said second color phosphor area, during said sweeping and modulating of steps (ak) and (al); and (aq) exposing a fifth line of said photosensitive medium, wherein said fifth line is substantially aligned with said first vertical position in said third color phosphor area, during said sweeping and modulating of steps (ao) and (ap).

27. An apparatus for bi-directionally sweeping an electron beam of a color CRT, to illuminate a plurality of color phosphor areas on a face of said color CRT, and to expose a photosensitive medium with light emitted from said face of said color CRT, said apparatus comprising:

a CRT scan drive system for sweeping said electron beam horizontally in a forward direction, and for sweeping said electron beam horizontally in a reverse direction opposite said forward direction within said plurality of color phosphor areas on said face of said color CRT; and a CRT data drive system connected to said CRT scan drive system for controlling an intensity of said electron beam to display a first row of dot row data processed in a forward order on a first color phosphor area on said face of said color CRT during said sweeping of said electron beam in said forward direction, and for controlling said intensity of said electron beam to display a second row of dot row data processed in a reverse order opposite said forward order on a second color phosphor area on said face of said color CRT during said sweeping of said electron beam in said reverse direction, wherein said CRT data drive system is synchronized with said CRT scan drive system, and further wherein said first row of dot row data displayed on said first color phosphor area on said face of said color CRT during said sweeping of said electron beam in said forward direction exposes said photosensitive medium with light emitted from said face of said color CRT, and said second row of dot row data displayed on said second color phosphor area on said face of said color CRT during said sweeping of said electron beam in said reverse direction exposes said photosensitive medium with light emitted from said face of said color CRT.

28. The apparatus for bi-directionally sweeping an electron beam of a color CRT, to illuminate a plurality of color phosphor areas on a face of said color CRT, and to expose a photosensitive medium with light emitted from said face of said color CRT according to claim 27, wherein said CRT scan drive system further comprises:

a deflection controller for generating a first plurality of horizontal position values for said sweeping of said electron beam horizontally in said forward direction, and for generating a second plurality of horizontal position values for said sweeping of said electron beam horizontally in said reverse direction, wherein each of said first plurality of horizontal position values and each of said second plurality of horizontal position values represent a specific horizontal location on one of said plurality of color phosphor areas on said face of said color CRT;

a horizontal look up table connected to an output of said deflection controller, wherein said horizontal look up table converts each of said first plurality of horizontal position values and each of said second plurality of horizontal position values to a plurality of horizontal numerical values, wherein each of said plurality of horizontal numerical values are output from said horizontal lookup table as a horizontal digital signal;

a first digital to analog converter connected to said horizontal digital signal of said horizontal look up table, wherein said first digital to analog converter converts each of said plurality of horizontal numerical values in said horizontal digital signal into a horizontal analog signal; and a CRT horizontal deflection winding connected to said horizontal analog signal of said first digital to analog converter, wherein said horizontal analog signal within said CRT horizontal deflection winding positions said electron beam within one of said plurality of color phosphor areas on said face of said color CRT at said specific horizontal locations corresponding to said horizontal position values;

wherein, said deflection controller generates said first plurality of horizontal position values for said sweeping of said electron beam horizontally in said forward direction while said CRT data drive system modulates said electron beam with said first row of dot row data on said first color phosphor area on said face of said color CRT, and said deflection controller generates said second plurality of horizontal position values for said sweeping of said electron beam horizontally in said reverse direction while said CRT data drive system modulates said electron beam with said second row of dot row data on said second color phosphor area on said face of said color CRT.

29. The apparatus for bi-directionally sweeping an electron beam of a color CRT, to illuminate a plurality of color phosphor areas on a face of said color CRT, and to expose a photosensitive medium with light emitted from said face of said color CRT according to claim 28, wherein said CRT scan drive system further comprises:

a vertical register for generating a plurality of vertical position values, wherein each of said plurality of vertical position values represent a specific vertical location on one of said plurality of color phosphor areas on said face of said color CRT, and further wherein, for each said sweeping of said electron beam horizontally in said forward direction, and for each said sweeping of said electron beam horizontally in said reverse direction, one of said plurality of vertical position values is output from said vertical register;

a vertical look up table connected to said output of said vertical register and connected to said output of said deflection controller, wherein said vertical look up table converts each of said one of said plurality of vertical position values to a plurality of vertical numerical values, wherein each of said plurality of vertical numerical values are output from said vertical look up table as a vertical digital signal;

a second digital to analog converter connected to said vertical digital signal of said vertical look up table, wherein said second digital to analog converter converts each of said plurality of vertical numerical values in said vertical digital signal into a vertical analog signal; and a CRT vertical deflection winding connected to said vertical analog signal of said second digital to analog converter, wherein said vertical analog signal within said CRT vertical deflection winding positions said electron beam within one of said plurality of color phosphor areas on said face of said color CRT at said specific vertical locations corresponding to said vertical position values;

wherein, said vertical register generates one of said plurality of vertical position values for holding said electron beam in one of said specific vertical locations within said first color phosphor area on said face of said color CRT for said sweeping of said electron beam horizontally in said forward direction while said CRT data drive system modulates said electron beam with said first row of dot row data on said first color phosphor area on said face of said color CRT, and said vertical register generates one of said plurality of vertical position values for holding said electron beam in one of said specific vertical locations within said second color phosphor area on said face of said color CRT for said sweeping of said electron beam horizontally in said reverse direction while said CRT data drive system modulates said electron beam with said second row of dot row data on said second color phosphor area on said face of said color CRT.

30. The apparatus for bi-directionally sweeping an electron beam of a color CRT, to illuminate a plurality of color phosphor areas on a face of said color CRT, and to expose a photosensitive medium with light emitted from said face of said color CRT according to claim 28, wherein said CRT data drive system further comprises:

an image/control buffer memory containing said first row of dot row data for display on said first color phosphor area on said face of said color CRT for said sweeping of said electron beam horizontally in said forward direction, and containing said second row of dot row data for display on said second color phosphor area on said face of said color CRT for said sweeping of said electron beam horizontally in said reverse direction;

an image look up table connected to an output of said image/control buffer memory, wherein said image lookup table converts said first row of dot row data for display on said first color phosphor area on said face of said color CRT for said sweeping of said electron beam horizontally in said forward direction, and converts said second row of dot row data for display on said second color phosphor area on said face of said color CRT for said sweeping of said electron beam horizontally in said reverse direction, into a plurality of numerical values, wherein each of said plurality of numerical values are output from said image lookup table as an image digital signal;

a third digital to analog converter connected to said image digital signal of said image look up table, wherein said third digital to analog converter converts each of said plurality of numerical values in said image digital signal into an image analog signal; and a CRT grid connected to said image analog signal of said third digital to analog converter, wherein said image analog signal within said CRT grid controls said intensity of said electron beam within said first and second color phosphor areas on said face of said color CRT;

wherein, said image/control buffer memory generates said first row of dot row data for display on said first color phosphor area on said face of said color CRT for said sweeping of said electron beam horizontally in said forward direction, and said image/control buffer memory generates said second row of dot row data for display on said second color phosphor area on said face of said color CRT for said sweeping of said electron beam horizontally in said reverse direction.

31. The apparatus for bi-directionally sweeping an electron beam of a color CRT, to illuminate a plurality of color phosphor areas on a face of said color CRT, and to expose a photosensitive medium with light emitted from said face of said color CRT according to claim 30, further comprising:

a first clock within said CRT scan drive system; and a second clock within said CRT data drive system;

wherein said first clock sends a synchronization signal to said second clock, and said second clock sends said synchronization signal to said image/control buffer memory, to determine when to output said plurality of numerical values as said image digital signal, and further wherein said deflection controller sends a horizontal synchronization signal to said first clock and to said second clock to control the start of said sweeping of said electron beam horizontally in said forward direction, and to control the start of said sweeping of said electron beam horizontally in said reverse direction.

32. The apparatus for bi-directionally sweeping an electron beam of a color CRT, to illuminate a plurality of color phosphor areas on a face of said color CRT, and to expose a photosensitive medium with light emitted from said face of said color CRT according to claim 27, further comprising:

a medium drive system connected to said CRT scan drive system and to said CRT data drive system;

a motor connected to said medium drive system; and a medium roll moved by said motor, wherein said photosensitive medium is attached to said medium roll;

wherein a control digital processing unit, connected to said medium drive system, controls said medium drive system which operates said motor, and further wherein said motor moves said medium roll, causing said photosensitive medium to move in relationship to said face of said color CRT.

33. An apparatus for bi-directionally sweeping an electron beam of a color CRT, to illuminate a plurality of color phosphor areas on a face of said color CRT, and to expose a photosensitive medium with light emitted from said face of said color CRT, said apparatus comprising:

a CRT scan drive system comprising a vertical deflection controller circuit for generating a vertical drive signal for selecting a plurality of vertical beam positions within said plurality of color phosphor areas on said face of said color CRT;

a horizontal sweep generator circuit for generating a horizontal drive signal, said horizontal drive signal being a substantially saw tooth voltage wave form, for driving a plurality of bi-directional horizontal sweeps of said electron beam;

a CRT vertical deflection winding, connected to said vertical deflection controller circuit, wherein said vertical drive signal received from said vertical deflection controller circuit causes a vertical deflection of said electron beam to one of said plurality of vertical beam positions;

a CRT horizontal deflection winding, connected to said horizontal sweep generator circuit, wherein said horizontal drive signal causes said electron beam to move in said plurality of bi-directional horizontal sweeps at a substantially constant velocity within said plurality of color phosphor areas on said face of said color CRT; and a CRT data drive system for controlling an intensity of said electron beam to display image data on said plurality of color phosphor areas on said face of said color CRT;

wherein said CRT vertical deflection winding and said CRT horizontal deflection winding together cause said plurality of bi-directional horizontal sweeps of said electron beam, wherein said electron beam sweeps horizontally in a forward direction, at one of said plurality of vertical beam positions, while said CRT data drive system displays said image data on said plurality of color phosphor areas on said face of said color CRT, exposing said photosensitive medium, and next said electron beam sweeps horizontally in a reverse direction, at one of said plurality of vertical beam positions, while said CRT data drive system displays said image data on said plurality of color phosphor areas on said face of said color CRT, exposing said photosensitive medium.

34. The apparatus for bi-directionally sweeping an electron beam of a color CRT, to illuminate a plurality of color phosphor areas on a face of said color CRT, and to expose a photosensitive medium with light emitted from said face of said color CRT according to claim 33, wherein said vertical deflection controller circuit further comprises:

a vertical register, wherein said vertical register outputs a plurality of vertical addresses for holding said electron beam in said plurality of vertical beam positions within said plurality of color phosphor areas on said face of said color CRT for said plurality of bi-directional horizontal sweeps;

a deflection controller, wherein said deflection controller outputs data and a plurality of control signals;

a vertical latch, connected to said vertical register and connected to said deflection controller, wherein said vertical latch receives said plurality of vertical addresses;

a vertical look up table, connected to said deflection controller and connected to said vertical latch, wherein said vertical look up table contains a plurality of numerical values for converting said plurality of vertical addresses received from said vertical latch into a vertical position signal for holding said electron beam at said plurality of vertical beam positions within said plurality of color phosphor areas on said face of said color CRT; and a first digital to analog converter, connected to said vertical look up table, which receives said vertical position signal from said vertical look up table and converts said vertical position signal into said vertical drive signal.

35. The apparatus for bi-directionally sweeping an electron beam of a color CRT, to illuminate a plurality of color phosphor areas on a face of said color CRT, and to expose a photosensitive medium with light emitted from said face of said color CRT according to claim 33, wherein said horizontal sweep generator circuit further comprises:

a deflection controller, wherein said deflection controller outputs data and a plurality of control signals;

a horizontal look up table, connected to said deflection controller and connected to said vertical latch, wherein said horizontal look up table contains a plurality of numerical values for sweeping said electron beam horizontally in a forward direction, and a plurality of numerical values for sweeping said electron beam horizontally in a reverse direction, for converting said data into a horizontal position signal; and a second digital to analog converter, connected to said horizontal look up table, which receives said horizontal position signal form said horizontal look up table and converts said horizontal position signal into said horizontal drive signal.

36. The apparatus for bi-directionally sweeping an electron beam of a color CRT, to illuminate a plurality of color phosphor areas on a face of said color CRT, and to expose a photosensitive medium with light emitted from said face of said color CRT according to claim 33, wherein said CRT data drive system further comprises:

- an image/control buffer memory containing a portion of said image data for display on said face of said color CRT for said sweeping of said electron beam horizontally in said forward direction, and a portion of said image data for display on said face of said color CRT for said sweeping of said electron beam horizontally in said reverse direction;
- an image look up table connected to an output of said image/control buffer memory, wherein said image lookup table contains a plurality of numerical values for translating each position of said portion of image data into a number representative of said intensity of said electron beam for said each position of said portion of said image data for display on said plurality of color phosphor areas on said face of said color CRT for said sweeping of said electron beam horizontally in said forward direction, and for translating each position of said portion of image data into a number representative of said intensity of said electron beam for said each position of said portion of said image data for display on said plurality of color phosphor areas on said face of said color CRT for said sweeping of said electron beam horizontally in said reverse direction;
- a third digital to analog converter connected to an output of said image look up table; and
- a CRT grid connected to an output of said third digital to analog converter, wherein an electrical signal within said CRT grid controls said intensity of said electron beam within said plurality of color phosphor areas on said face of said color CRT;
- wherein, said image/control buffer memory generates a sequence of said image data for display on said plurality of color phosphor areas on said face of said color CRT for said sweeping of said electron beam horizontally in said forward direction, and said image/control buffer memory generates a sequence of said image data for display on said plurality of color phosphor areas on said face of said color CRT for said sweeping of said electron beam horizontally in said reverse direction.

37. The apparatus for bi-directionally sweeping an electron beam of a color CRT, to illuminate a plurality of color phosphor areas on a face of said color CRT, and to expose a photosensitive medium with light emitted from said face of said color CRT according to claim 36, further comprising:

- a first clock within said CRT scan drive system; and
- a second clock within said CRT data drive system;
- wherein said first clock sends a synchronization signal to said second clock, and said second clock sends a clocked signal to said image/control buffer memory to determine when to change said numerical values for translating said each position of said portion of image data into a number representative of said intensity of said electron beam, and further wherein a deflection controller sends a horizontal synchronization signal to said first clock and to said second clock to control the start of said sweeping of said electron beam horizontally in said forward direction, and to control the start of said sweeping of said electron beam horizontally in said reverse direction.

38. The apparatus for bi-directionally sweeping an electron beam of a color CRT, to illuminate a plurality of color phosphor areas on a face of said color CRT, and to expose a photosensitive medium with light emitted from said face of said color CRT according to claim 33, further comprising:

- a medium drive system connected to said CRT scan drive system and to said CRT data drive system;
- a motor connected to said medium drive system; and
- a medium roll moved by said motor, wherein said photosensitive medium is attached to said medium roll;
- wherein a control digital processing unit, connected to said medium drive system, controls said medium drive system which operates said motor, and further wherein said motor moves said medium roll, causing said photosensitive medium to move in relationship to said face of said color CRT.

* * * * *